US008620895B1

(12) United States Patent
Lish et al.

(10) Patent No.: US 8,620,895 B1
(45) Date of Patent: Dec. 31, 2013

(54) MAPPING ORGANIZATIONAL ACCOUNTING CODES TO ACCESS BUSINESS INFORMATION

(75) Inventors: David F. Lish, Burlingame, CA (US);
Memet Firat Ozkan, San Diego, CA (US); Alan M. Poulin, San Diego, CA (US); Jason K. De Mello, Poway, CA (US); Johan A. Johansson, Tucson, AZ (US); Kathleen P. Russell, San Diego, CA (US)

(73) Assignee: Intuit Inc., Mountain View, CA (US)

( * ) Notice: Subject to any disclaimer, the term of this patent is extended or adjusted under 35 U.S.C. 154(b) by 44 days.

(21) Appl. No.: 13/301,647

(22) Filed: Nov. 21, 2011

(51) Int. Cl.
*G06F 17/30* (2006.01)
(52) U.S. Cl.
USPC ............ 707/706; 707/710; 707/763; 707/769
(58) Field of Classification Search
USPC .................................. 707/706, 710, 763, 769
See application file for complete search history.

(56) References Cited

U.S. PATENT DOCUMENTS

| | | | |
|---|---|---|---|
| 7,028,057 B1 * | 4/2006 | Vasudevan et al. ........... | 707/695 |
| 8,489,872 B1 * | 7/2013 | Kapoor ......................... | 713/100 |
| 2003/0120372 A1 * | 6/2003 | Ruth et al. ..................... | 700/108 |
| 2005/0086239 A1 * | 4/2005 | Swann et al. .................. | 707/100 |
| 2005/0171830 A1 * | 8/2005 | Miller et al. ...................... | 705/8 |
| 2006/0235774 A1 * | 10/2006 | Campbell et al. ............... | 705/30 |
| 2007/0156677 A1 * | 7/2007 | Szabo ............................... | 707/5 |
| 2007/0244865 A1 * | 10/2007 | Gordon et al. .................... | 707/3 |
| 2009/0018996 A1 * | 1/2009 | Hunt et al. ......................... | 707/2 |
| 2010/0205541 A1 * | 8/2010 | Rapaport et al. .............. | 715/753 |
| 2010/0332583 A1 * | 12/2010 | Szabo .......................... | 709/202 |
| 2011/0113026 A1 * | 5/2011 | Lee et al. ...................... | 707/722 |

\* cited by examiner

*Primary Examiner* — Hanh Thai
(74) *Attorney, Agent, or Firm* — Park, Vaughan, Fleming & Dowler LLP; Steven E. Stupp

(57) ABSTRACT

During a data-access technique, a query that is associated with an organizational accounting code is used to generate a set of queries for business databases. In particular, when generating the set of queries, the organizational accounting code is mapped to a set of database-specific accounting codes using a reclassification list. After receiving answers to the set of queries (which are associated with the set of database-specific accounting codes) from the business databases, the answers are presented to the user. In this way, the user can access the business databases, which may have incompatible database-specific accounting codes, from a single environment with little or no additional effort or expense.

21 Claims, 6 Drawing Sheets

MAPPING ORGANIZATIONAL ACCOUNTING CODES TO ACCESS BUSINESS INFORMATION

BACKGROUND

The present disclosure relates to techniques for accessing business information in disparate databases.

Managers in companies routinely make decisions to allocate limited funds to invest in their businesses. Ideally, these investments will result in the highest rate of return for the companies. However, in practice it is often difficult for managers to access the information they need to make the best investment decisions.

In particular, as a company grows in size, its internal structure, which can include multiple business units, departments and groups, often becomes fragmented and complicated. For example, different portions of the company may use different kinds of business information (such as financial information, personnel information, asset information, etc.), and this business information may be organized in different ways (including different categories) in different databases. As a consequence, it can be difficult for managers to cross these internal information barriers to access the business information they need to make informed decisions based on the opportunity costs. In addition, this lack of 'situation awareness' often results in the perception that resources are 'free' or have no cost to the company, which undermines accountability and can lead management to become lax in their decisions.

SUMMARY

The disclosed embodiments relate to a computer system that accesses information in business databases. During operation, the computer system receives a query from a user. This query is associated with an organizational accounting code. Then, the computer system generates a set of queries for the business databases based on the query and a reclassification list, where generating the set of queries involves using the reclassification list to map the organizational accounting code to a set of database-specific accounting codes for the set of queries. Moreover, the computer system provides the set of queries, which are associated with the database-specific accounting codes, to the business databases, and receives answers to the set of queries from the business databases. Next, the computer system presents the answers to the user.

Note that the organizational accounting code may include a company group department accounting code that represents a business expense within a business hierarchy. Furthermore, the business databases may be associated with different organizations in a business and/or different functions of the organizations in the business. Additionally, the business databases may be associated with different database vendors.

Moreover, database-specific accounting codes for at least two of the business databases may be incompatible with each other.

In some embodiments, generating the set of queries facilitates access to the databases by the user from a single environment. This set of queries may be generated without the user performing a manual mapping from the organizational accounting code to the database-specific accounting codes.

Furthermore, the answers may include analysis of a business expense to facilitate allocation of resources within a business. For example, the answers may include an opportunity cost associated with the business expense. Alternatively or additionally, the answers may include a business forecast, and the computer system may reallocate resources within a business based on the answers.

Another embodiment provides a method that includes at least some of the operations performed by the computer system.

Another embodiment provides a computer-program product for use with the computer system. This computer-program product includes instructions for at least some of the operations performed by the computer system.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of a computer system, a technique for accessing information in business databases, and a computer-program product (e.g., software) for use with the computer system are described. During this data-access technique, a query that is associated with an organizational accounting code is used to generate a set of queries for business databases. In particular, when generating the set of queries, the organizational accounting code is mapped to a set of database-specific accounting codes using a reclassification list. (Note that this reclassification list may be dynamically generated based on ongoing activity within a company or an organization, for example, by using an automatic categorization engine.) After receiving answers to the set of queries (which are associated with the set of database-specific accounting codes) from the business databases, the answers are presented to the user. In this way, the user can access the business databases, which may have incompatible database-specific accounting codes, from a single environment with little or no additional effort or expense.

By facilitating access to the business databases, this data-access technique may enable analysis of business expenses across different organizations and/or functions in a business. In turn, this analysis may facilitate reallocation of resources within the business. This capability may allow businesses to operate more efficiently and to implement improved company-wide planning, thereby increasing their revenue and profits.

In the discussion that follows, a user may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
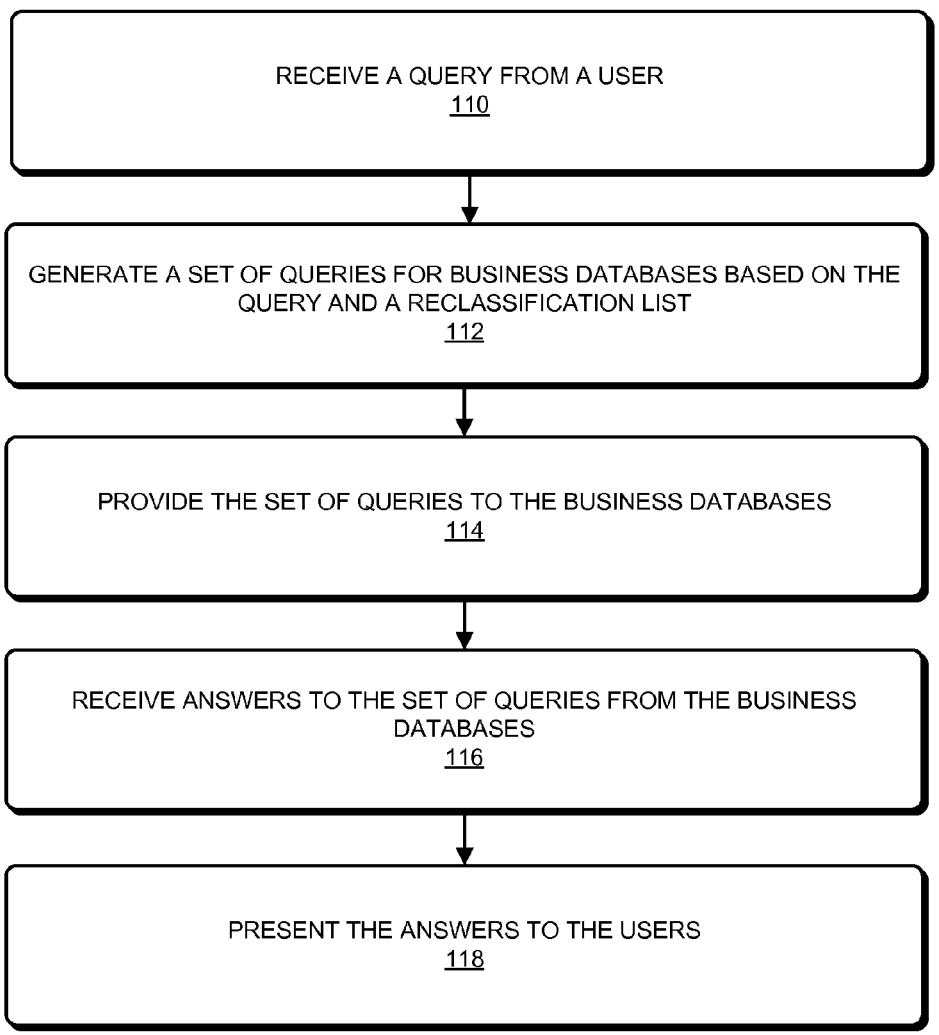
FIG. 1 is a flow chart illustrating a method for accessing information in business databases in accordance with an embodiment of the present disclosure.

We now describe embodiments of the data-access technique. FIG. 1 presents a flow chart illustrating a method 100 for accessing information in business databases, which may be performed by a system (such as system 400 in FIG. 4) and/or a computer system (such as computer system 500 in FIG. 5) in this system. During operation, the computer system receives a query from a user (operation 110). This query is associated with an organizational accounting code. For example, the organizational accounting code may include a company group department accounting code that represents a business expense within a business hierarchy (such as the organizations within or portions of a company).

Then, the computer system generates a set of queries for the business databases based on the query and a reclassification list (operation 112), where generating the set of queries involves using the reclassification list to map the organizational accounting code to a set of database-specific accounting codes for the set of queries. Note that the business databases may be associated with different organizations in a business and/or different functions of the organizations in the business, and the business databases may be associated with different database vendors. For example, the business databases may include financial information and other (non-financial) information, such as information about employees and/or corporate assets. Additionally, database-specific accounting codes for at least two of the business databases may be incompatible with each other.

Moreover, the computer system provides the set of queries (which are associated with the database-specific accounting codes) to the business databases (operation 114), and receives answers to the set of queries from the business databases (operation 116). Next, the computer system presents the answers to the user (operation 118).

In some embodiments, generating the set of queries (operation 112) facilitates access to the databases by the user from a single environment. This set of queries may be generated without the user performing a manual mapping from the organizational accounting code to the database-specific accounting codes (i.e., without manual input from the user). Thus, the data-access technique may allow the databases to be aggregated or integrated into a unified source of information.

Furthermore, the answers may include analysis of a business expense to facilitate allocation of resources within a business. For example, the answers may include an opportunity cost associated with the business expense. Alternatively or additionally, the answers may include a business forecast, and the computer system may reallocate resources within a business based on the answers.

Figure 2:
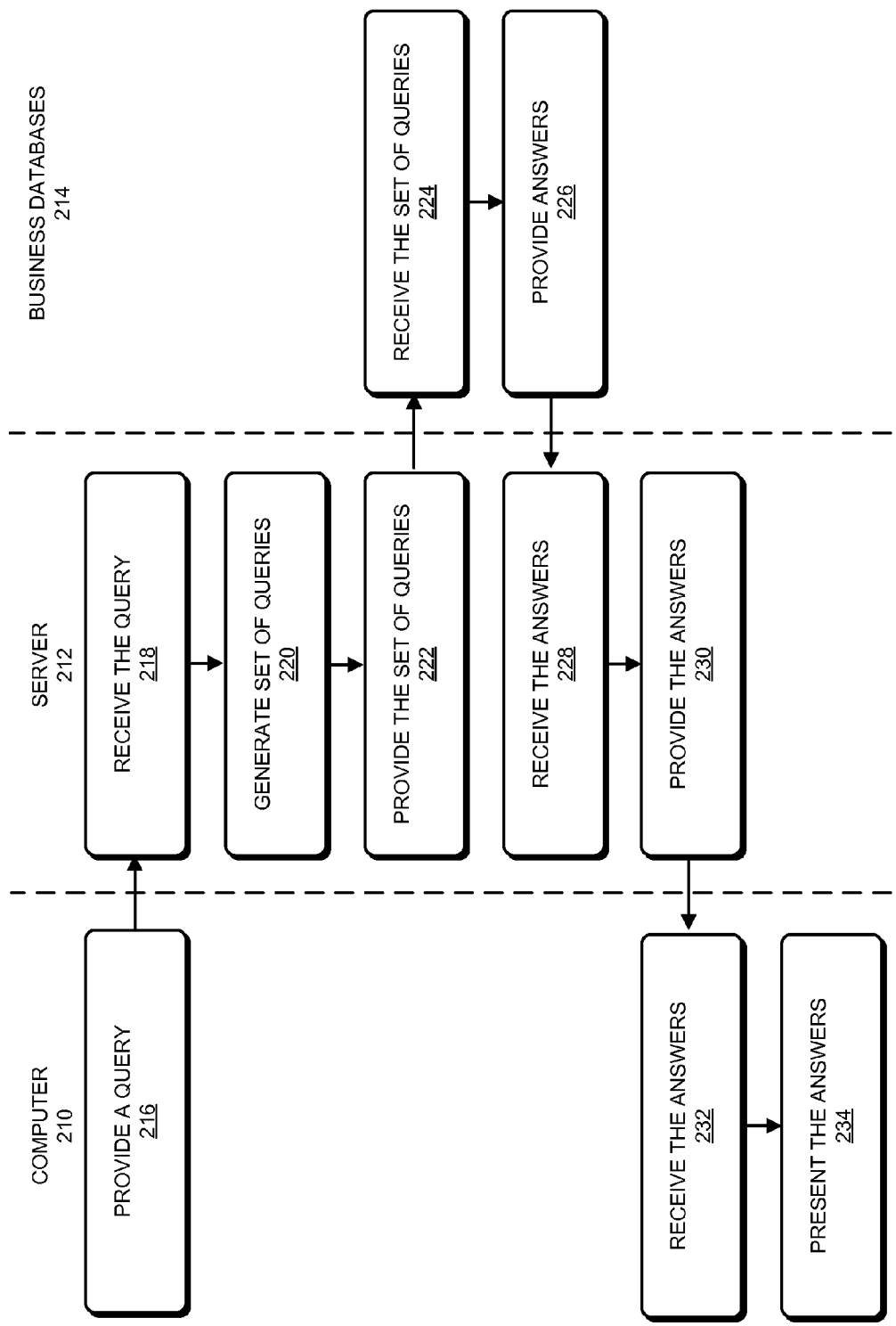
FIG. 2 is a flow chart illustrating the method of FIG. 1 in accordance with an embodiment of the present disclosure.

In an exemplary embodiment, the generating technique is implemented using a computer and at least one server, which communicate through a network, such as the Internet (e.g., using a client-server architecture). This is illustrated in FIG. 2, which presents a flow chart illustrating method 100. During this method, a user of computer 210 may provide a query (operation 216), associated with an organizational accounting code, to access information in disparate (e.g., incompatible) business databases 214. This query may be received by server 212 (operation 218).

Server 212 may generate a set of queries (operation 220) for business databases 214 based on the query and a reclassification list or table. For example, server 212 may use the reclassification list to map the organizational accounting code to a set of database-specific accounting codes for the set of queries.

Then, server 212 may provide the set of queries (operation 222) and the associated database-specific accounting codes to business databases 214. After receiving the set of queries (operation 224), business databases 214 may provide answers (operation 226) to the set of queries, which are received (operation 228) by server 212.

Next, server 212 may provide the answers (operation 230), which are received (operation 232) by computer 210, and which are then presented (operation 234) to the user.

In some embodiments of method 100 (FIGS. 1 and 2), there may be additional or fewer operations. Moreover, the order of the operations may be changed, and/or two or more operations may be combined into a single operation.

Figure 3:
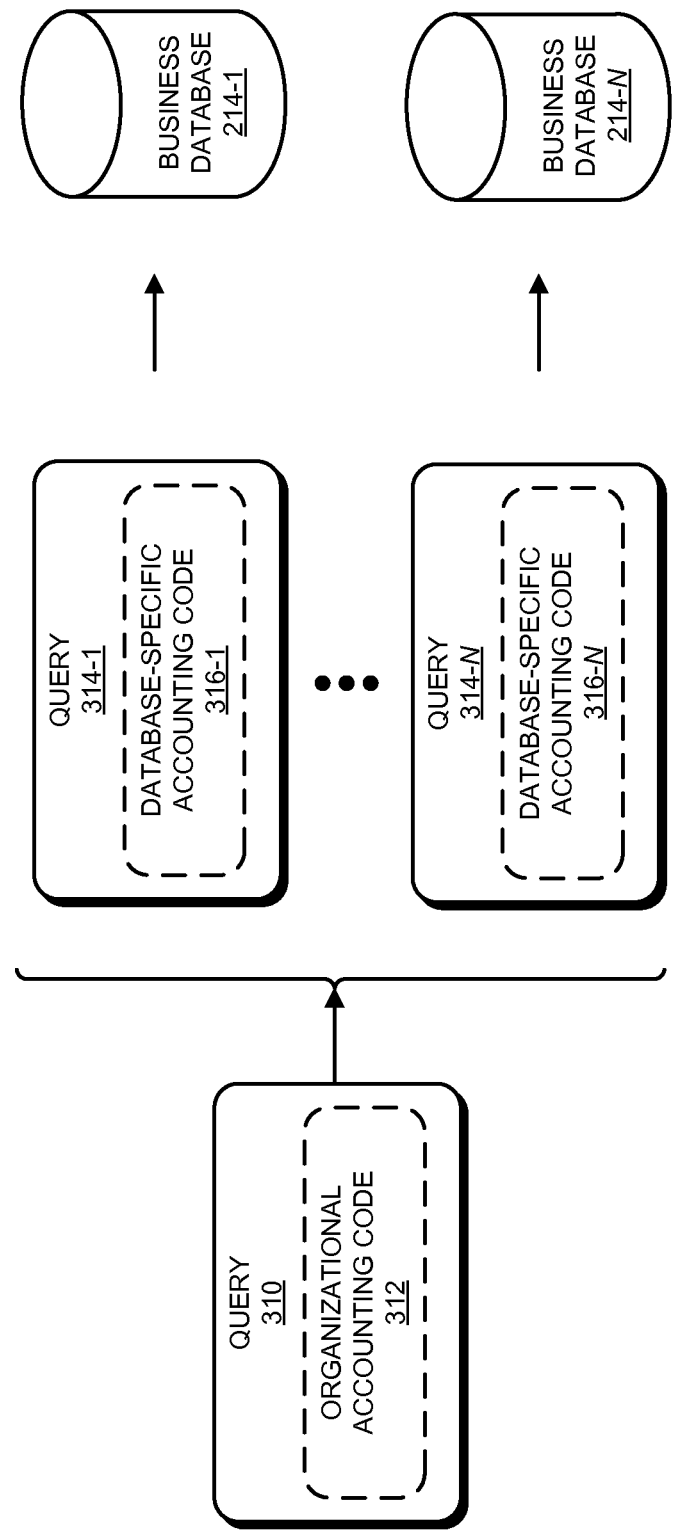
FIG. 3 is a block diagram illustrating mapping from organizational accounting codes to database-specific accounting codes in accordance with an embodiment of the present disclosure.

FIG. 3 presents a block diagram illustrating mapping from organizational accounting codes to database-specific accounting codes. In particular, query 310 and associated organizational accounting code 312 may be mapped to a set of queries 314 and database-specific accounting codes 316, which may be used to access information in business databases 214.

In an exemplary embodiment, the data-access technique is used to understand disparate cost codes and to present this information to a manager in a single-viewing environment. This can be accomplished by reclassifying the codes into a common set of cost codes so that the associated information in the different databases can be rolled up into a complete view of an organization. This mapping may be performed without manual input from the user. Moreover, this approach may allow information associated with costs (such the costs associated with a business decision) to be assembled.

In some embodiments, the data-access technique benchmarks external costs (for example, by accessing databases external to a company or an organization, which may include non-business databases). Moreover, using the answers, a manager in a company can increase or decrease the allocation of resources based on a company forecast and/or a macroeconomic forecast. Thus, if demand is increasing or decreasing, the manager can change the number of software licenses or the manager can rent more (or less) real estate. Furthermore, the manager can communicate the answers to a portion of the company (such as a department) that manages information technology or assets.

The data-access technique can give the company, the business units, the departments and/or groups insight into their true profit and loss, including allocations from shared services. This disseminated information or 'situational awareness' can allow the different portions of the company to take a more active role in ensuring that they are only using the resources that they need. This can increase the efficiency of the company, which will allow extra resources to be allocated to the fastest growing portions of the company.

In an exemplary embodiment, the data-access technique is implemented in a system that uses an automatic categorization engine, which performs indexing and classification. The automatic categorization engine may be applied to corporate finances and business expenses, thereby allowing it to recognize: cost codes, employee names, asset tags, and cube/space numbers.

The automatic categorization engine may be able to determine and/or learn which organizational accounting codes are associated with particular business units (or portions of a company or organization), as well as the associated expenses. In this way, the automatic categorization engine may be able to dynamically generate the reclassification list (e.g., the reclassification list may be revised continuously or after a predefined time interval, such as a day, a week, a month, etc.), thereby reducing or eliminating the associated manual effort (such as that associated with data manipulation and/or categorization of data).

Subsequently, the automatic categorization engine can interpret what group (or portion of the company) a particular line-item expense (such as an employee, an asset, a software license, real estate, etc.) belongs to, and can aggregate this information for the manager(s) of the company. In addition, the automatic categorization engine may allow the system to determine or learn how different items have historically been categorized or classified and, thus, it may become more accurate over time.

After data population, the system can present the managers of the company intuitive views, from a holistic business overview, of costs at different levels in the corporate hierarchy, from business units all the way down to an employee level. This system may allow the managers to adjust resource allocations accordingly. Because the system has a holistic overview of the needs of the entire company, it may also facilitate the exchange of assets and software licenses within the company, and/or it may be used to allow the resources to be allocated where the need is greatest.

In an exemplary embodiment, the data-access technique is used to reallocate software licenses. In particular, Mr. Cooper, a manager of a group in a business unit, indicates that he needs a 3-year agreement for 150 licenses of a software product. He contacts the purchasing department and works with them to get a low-cost price for the software licenses. Then, he generates a purchase order and, after it is approved, receives the software product.

One year later, the company's plans change, and Mr. Cooper determines that he no longer needs 50 of his 150 software licenses. He may use the computer system that implements the data-access technique to enter this information into the single-viewing environment (and, thus, to communicate this information across the company). Two weeks later, he may be contacted by another business unit and informed that they need 25 software licenses and that his group will not be charged for these software licenses. Moreover, at the end of the 3-year license agreement, the company can retire the remaining 25 software licenses because they are no longer needed, thereby eliminating this unnecessary ongoing expense.

In this example, the data-access technique can be used to facilitate the dissemination of the information about the extra software licenses. For example, when Mr. Cooper generated his purchase order for 150 software licenses, the system that implements the data-access technique may note that, based on the cost code in his purchase order, these software licenses should be charged to his group. One year later, when Mr. Cooper indicates that the extra 50 software licenses are available, the system may note the exact cost of the contract and the percentage of the contract that is unused. Then, when the other business unit decides to take 25 of the 50 software licenses, the system may know the appropriate cost code for the requestor and may re-allocate half of the unused portion of the contract to the new cost code. Finally, in year 3, when the new contract is being negotiated, the system may recognize that the new total number of licenses in the contract is 125 and may retire the 25 licenses that it knows are currently unused. Moreover, these operations may be performed with little or no manual intervention.

In another exemplary embodiment, the data-access technique is used to remove allocations associated with an employee. In particular, Ted may be a director of a business unit. If, due to a budget cut, Ted is forced to terminate an engineer, he may use the system that implements the data-access technique to see all the allocations that his group is charged for his employees (including software licenses, assets, facilities, salary, etc.) to make an optimal decision.

If Ted indicates to the system that a given employee is no longer with the company, he may be presented with confirmation that the associated allocations will be removed as soon as possible. Based on the update provided by Ted, the system may alert other managers in the company that the software and hardware that the employee was using are available. When another group indicates that they will use the available software and/or hardware, the cost coding may be automatically changed from Ted's group. Furthermore, the system may inform facilities that the space used by the employee is available and can be assigned to someone else. Once another group indicates they will use this space, the cost coding may be automatically changed so it is no longer charged to Ted's group. In addition, human resources may be automatically informed by the system when the employee is terminated, and his salary may no longer be charged back to Ted's group.

Figure 4:
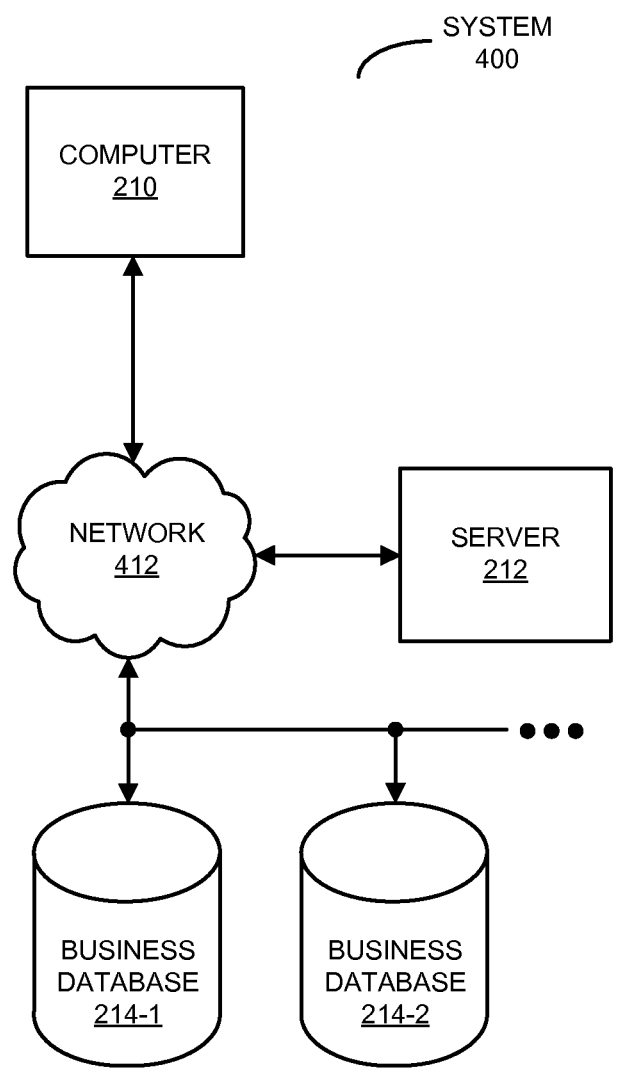
FIG. 4 is a block diagram illustrating a system that performs the method of FIGS. 1 and 2 in accordance with an embodiment of the present disclosure.

We now describe embodiments of the system and the computer system, and their use. FIG. 4 presents a block diagram illustrating a system 400 that performs method 100 (FIGS. 1 and 2). In this system, a user of computer 210 may use a software product, such as a software application that is resident on and that executes on computer 210. (Alternatively, the user may interact with a web page that is provided by server 212 via network 412, and which is rendered by a web browser on computer 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on computer 210 (such as a software application that is provided by server 212 or that is installed and which executes on computer 210).

As discussed previously, the user may use the software product to provide a query, via network 412, to server 212. This query (which is associated with an organizational accounting code) may request information in disparate (e.g., incompatible) business databases 214.

In response to the query, server 212 may use a reclassification list to generate a set of queries by mapping the organizational accounting code to a set of database-specific accounting codes for the set of queries. Then, via network 412, server 212 may provide the set of queries to business databases 214.

After receiving the set of queries, business databases 214 may provide, via network 412, answers to the set of queries to server 212. Next, server 212 may provide the answers, via network 412, to computer 210, which presents them to the user.

Note that information in system 400 may be stored at one or more locations in system 400 (i.e., locally or remotely). Moreover, because this data may be sensitive in nature, it may be encrypted. For example, stored data and/or data communicated via network 412 may be encrypted.

Figure 5:
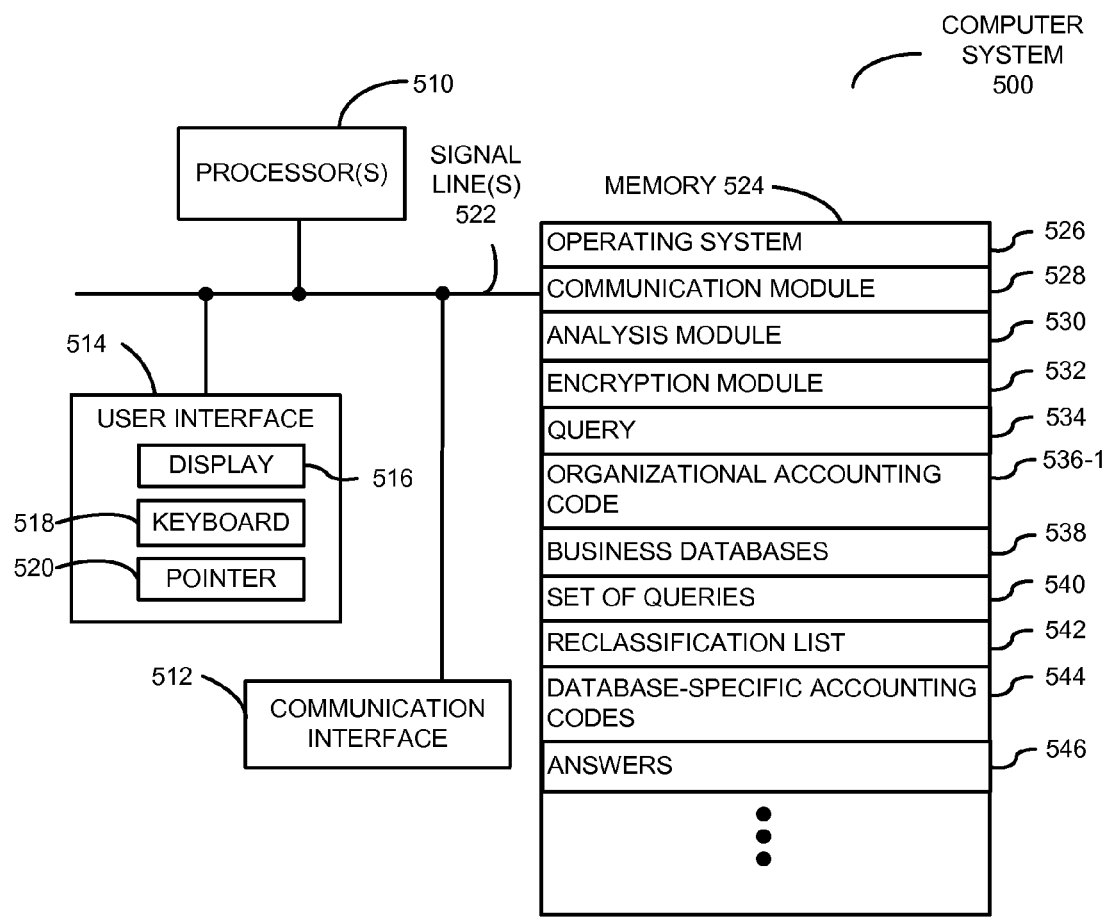
FIG. 5 is a block diagram illustrating a computer system that performs the method of FIGS. 1 and 2 in accordance with an embodiment of the present disclosure.

FIG. 5 presents a block diagram illustrating a computer system 500 that performs method 100 (FIGS. 1 and 2), such as server 212 (FIGS. 2 and 4). Computer system 500 includes one or more processing units or processors 510, a communication interface 512, a user interface 514, and one or more signal lines 522 coupling these components together. Note that the one or more processors 510 may support parallel processing and/or multi-threaded operation, the communication interface 512 may have a persistent communication connection, and the one or more signal lines 522 may constitute a communication bus. Moreover, the user interface 514 may include: a display 516, a keyboard 518, and/or a pointer 520, such as a mouse.

Memory 524 in computer system 500 may include volatile memory and/or non-volatile memory. More specifically, memory 524 may include: ROM, RAM, EPROM, EEPROM, flash memory, one or more smart cards, one or more magnetic disc storage devices, and/or one or more optical storage devices. Memory 524 may store an operating system 526 that includes procedures (or a set of instructions) for handling various basic system services for performing hardware-dependent tasks. Memory 524 may also store procedures (or a set of instructions) in a communication module 528. These communication procedures may be used for communicating with one or more computers and/or servers, including computers and/or servers that are remotely located with respect to computer system 500.

Memory 524 may also include multiple program modules (or sets of instructions), including: analysis module 530 (or a set of instructions) and/or encryption module 532 (or a set of instructions). Note that one or more of these program modules (or sets of instructions) may constitute a computer-program mechanism.

During method 100 (FIGS. 1 and 2), analysis module 530 receives a query 534, associated with an organizational accounting code 536-1, from a user via communication interface 512 and communication module 528. This query may be for information included in business databases 538.

Analysis module 530 may generate a set of queries 540 for business databases 538 based on query 534 and a reclassification list 542. For example, generating set of queries 540 may involve using reclassification list 542 to map organizational accounting code 536-1 to a set of database-specific accounting codes 544 for set of queries 540.

Figure 6:
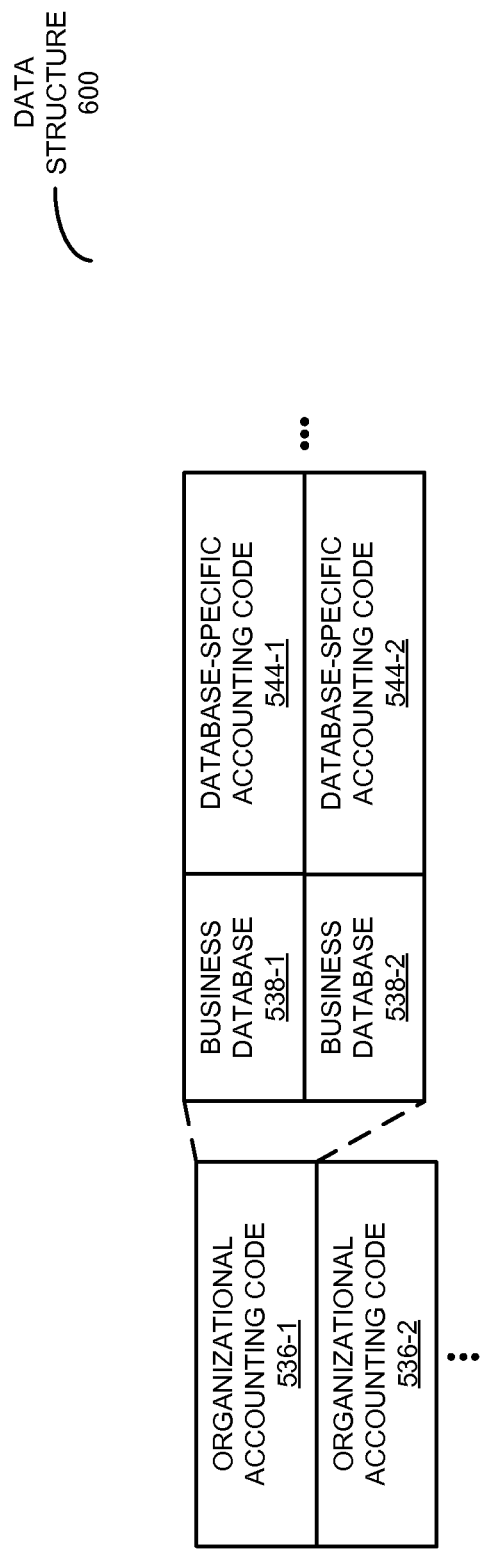
FIG. 6 is a block diagram illustrating a data structure for use in the computer system of FIG. 5 in accordance with an embodiment of the present disclosure.

Note that reclassification list 542 may be included in a data structure. This is shown in FIG. 6, which illustrates a data structure 600. In particular, data structure 600 may include organizational accounting codes 536 which are linked to database-specific accounting codes 544 and associated business databases 538.

Referring back to FIG. 5, analysis module 530 may provide set of queries 540 to business databases 538, and may receive answers 546 to set of queries 540 from business databases 538. Next, computer system 500 may presents answers 546 to the user. For example, answers 546 may be displayed on display 516.

Because information in computer system 500 may be sensitive in nature, in some embodiments at least some of the data stored in memory 524 and/or at least some of the data communicated using communication module 528 is encrypted using encryption module 532.

Instructions in the various modules in memory 524 may be implemented in: a high-level procedural language, an object-oriented programming language, and/or in an assembly or machine language. Note that the programming language may be compiled or interpreted, e.g., configurable or configured, to be executed by the one or more processors 510.

Although computer system 500 is illustrated as having a number of discrete items, FIG. 5 is intended to be a functional description of the various features that may be present in computer system 500 rather than a structural schematic of the embodiments described herein. In practice, and as recognized by those of ordinary skill in the art, the functions of computer system 500 may be distributed over a large number of servers or computers, with various groups of the servers or computers performing particular subsets of the functions. In some embodiments, some or all of the functionality of computer system 500 may be implemented in one or more application-specific integrated circuits (ASICs) and/or one or more digital signal processors (DSPs).

Computer systems (such as computer system 500), as well as computers and servers in system 400 (FIG. 4) may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 412 (FIG. 4) may include: the Internet, World Wide Web (WWW), an intranet, a cellular-telephone network, LAN, WAN, MAN, or a combination of networks, or other technology enabling communication between computing systems.

System 400 (FIG. 4), computer system 500 (FIG. 5) and/or data structure 600 may include fewer components or additional components. Moreover, two or more components may be combined into a single component, and/or a position of one or more components may be changed. In some embodiments, the functionality of system 400 (FIG. 4) and/or computer system 500 may be implemented more in hardware and less in software, or less in hardware and more in software, as is known in the art.

While business information is used as an illustrative example in the preceding embodiments, more generally the information accessed in the different databases can include an arbitrary type of information, including personal information. Thus, the accessed information may include business information and/or non-business information.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-implemented method for accessing information in business databases, the method comprising:

receiving a query from a user, wherein the query is associated with an organizational accounting code;

dynamically generating a mapping using a reclassification list, wherein the mapping maps the organizational accounting code to a plurality of database-specific accounting codes, and wherein the plurality of database-specific accounting codes correspond to a plurality of business databases;

generating, using the computer, a set of database queries for the plurality of business databases based on the received query and the dynamically generated mapping;

providing the generated set of database queries, which are associated with the database-specific accounting codes, to the business databases;

receiving answers to the set of queries from the business databases; and presenting the answers to the user.

2. The method of claim 1, wherein the organizational accounting code includes a company group department accounting code that represents a business expense within a business hierarchy.

3. The method of claim 1, wherein the business databases are associated with different organizations in a business.

4. The method of claim 1, wherein the business databases are associated with different functions of organizations in a business.

5. The method of claim 1, wherein the business databases are associated with different database vendors.

6. The method of claim 1, wherein database-specific accounting codes for at least two of the business databases are incompatible with each other.

7. The method of claim 1, wherein generating the set of queries facilitates access to the databases by the user from a single environment.

8. The method of claim 1, wherein the set of queries are generated without the user performing a manual mapping from the organizational accounting code to the database-specific accounting codes.

9. The method of claim 1, wherein the answers include analysis of a business expense to facilitate allocation of resources within a business.

10. The method of claim 9, wherein the answers include an opportunity cost associated with the business expense.

11. The method of claim 1, wherein the answers include a business forecast; and wherein the method further comprises reallocating resources within a business based on the answers.

12. A computer-program product for use in conjunction with a computer system, the computer-program product comprising a non-transitory computer-readable storage medium and a computer-program mechanism embedded therein, to access information in business databases, the computer-program mechanism including:

instructions for receiving a query from a user, wherein the query is associated with an organizational accounting code;

instructions for dynamically generating a mapping using a reclassification list, wherein the mapping maps the organizational accounting code to a plurality of database-specific accounting codes, and wherein the plurality of database-specific accounting codes correspond to a plurality of business databases;

instructions for generating a set of database queries for the plurality of business databases based on the received query and the dynamically generated mapping;

instructions for providing the generated set of database queries, which are associated with the database-specific accounting codes, to the business databases;

instructions for receiving answers to the set of queries from the business databases; and instructions for presenting the answers to the user.

13. The computer-program product of claim 12, wherein the organizational accounting code includes a company group department accounting code that represents a business expense within a business hierarchy.

14. The computer-program product of claim 12, wherein the business databases are associated with different organizations in a business.

15. The computer-program product of claim 12, wherein the business databases are associated with different functions of organizations in a business.

16. The computer-program product of claim 12, wherein database-specific accounting codes for at least two of the business databases are incompatible with each other.

17. The computer-program product of claim 12, wherein generating the set of queries facilitates access to the databases by the user from a single environment.

18. The computer-program product of claim 12, wherein the set of queries are generated without the user performing a manual mapping from the organizational accounting code to the database-specific accounting codes.

19. The computer-program product of claim 12, wherein the answers include analysis of a business expense to facilitate allocation of resources within a business.

20. The computer-program product of claim 12, wherein the answers include a business forecast; and wherein the computer-program mechanism includes instructions for reallocating resources within a business based on the answers.

21. A computer system, comprising:

a processor;

memory; and a program module, wherein the program module is stored in the memory and configurable to be executed by the processor to access information in business databases, the program module including:

instructions for receiving a query from a user, wherein the query is associated with an organizational accounting code;

instructions for dynamically generating a mapping using a reclassification list, wherein the mapping maps the organizational accounting code to a plurality of database-specific accounting codes, and wherein the plurality of database-specific accounting codes correspond to a plurality of business databases;

instructions for generating a set of database queries for the plurality of business databases based on the received query and the dynamically generated mapping;

instructions for providing the set of queries, which are associated with the database-specific accounting codes, to the business databases;

instructions for receiving answers to the set of queries from the business databases; and instructions for presenting the answers to the user.

* * * * *

UNITED STATES PATENT AND TRADEMARK OFFICE
CERTIFICATE OF CORRECTION

PATENT NO. : 8,620,895 B1  
APPLICATION NO. : 13/301647  
DATED : December 31, 2013  
INVENTOR(S) : David F. Lish et al.

Page 1 of 1

It is certified that error appears in the above-identified patent and that said Letters Patent is hereby corrected as shown below:

On the title page item (75) please replace the second inventor's name "MEMET" with --MEHMET-- so that the name reads: --MEHMET FIRAT OZKAN--.

Signed and Sealed this  
Sixth Day of May, 2014

Michelle K. Lee  
*Deputy Director of the United States Patent and Trademark Office*